United States Patent
Huang

(10) Patent No.: US 9,437,194 B2
(45) Date of Patent: Sep. 6, 2016

(54) ELECTRONIC DEVICE AND VOICE CONTROL METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ren-Wen Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 640 days.

(21) Appl. No.: 13/898,481

(22) Filed: May 21, 2013

(65) Prior Publication Data

US 2014/0324425 A1 Oct. 30, 2014

(30) Foreign Application Priority Data

Apr. 29, 2013 (CN) .......................... 2013 1 01579267

(51) Int. Cl.
| | | |
|---|---|---|
| *G10L 15/00* | (2013.01) | |
| *G10L 15/26* | (2006.01) | |
| *G10L 17/22* | (2013.01) | |
| *G10L 15/22* | (2006.01) | |

(52) U.S. Cl.
CPC ............... *G10L 17/22* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 7,065,489 B2* | 6/2006 | Hisaminato | ............. | G10L 13/06 704/268 |
| 7,275,032 B2* | 9/2007 | Macleod | ................. | G10L 13/00 379/88.01 |
| 7,315,821 B2* | 1/2008 | Monchi | ................. | G06F 19/322 704/273 |
| 7,587,312 B2* | 9/2009 | Kim | ......................... | G10L 21/04 704/205 |
| 7,725,316 B2* | 5/2010 | Chengalvarayan | ... | G10L 15/065 704/234 |
| 8,195,460 B2* | 6/2012 | Degani | .................... | G10L 15/06 704/207 |
| 8,335,689 B2* | 12/2012 | Wittenstein | ............. | G10L 15/26 704/231 |
| 8,682,666 B2* | 3/2014 | Degani | .................... | G10L 15/06 704/207 |
| 2009/0089065 A1* | 4/2009 | Buck | .................... | B60R 16/0373 704/275 |
| 2010/0268538 A1* | 10/2010 | Ryu | ......................... | G10L 17/00 704/250 |
| 2011/0087491 A1* | 4/2011 | Wittenstein | ............. | G10L 15/26 704/235 |
| 2013/0085758 A1* | 4/2013 | Csoma | .................. | G06F 19/345 704/260 |
| 2013/0339015 A1* | 12/2013 | Lee | ......................... | G10L 21/00 704/235 |
| 2015/0127344 A1* | 5/2015 | Ryu | ......................... | G10L 17/00 704/246 |

\* cited by examiner

*Primary Examiner* — Satwant Singh

(74) *Attorney, Agent, or Firm* — Zhigang Ma

(57) ABSTRACT

A voice control method is applied in an electronic device. The electronic device includes a voice input unit, a play unit, and a storage unit storing a conversation database and an association table between different ranges of voice characteristics and styles of response voice. The method includes the following steps. Obtaining voice signals input via the voice input unit. Determining which content is input according to the obtained voice signals. Searching in the conversation database to find a response corresponding to the input content. Analyzing voice characteristics of the obtained voice signals. Comparing the voice characteristics of the obtained voice signals with the pre-stored ranges. Selecting the associated response voice. Finally, outputting the found response using the associated response voice via the play unit.

2 Claims, 2 Drawing Sheets

ELECTRONIC DEVICE AND VOICE CONTROL METHOD THEREOF

BACKGROUND

1. Technical Field

The present disclosure relates to electronic devices, and particularly to an electronic device and a voice control method adapted for the electronic device.

2. Description of Related Art

Many electronic devices, such as mobile phones, tablet computers, and multimedia players, use voice recognition technology to receive voice input. The same computer generated voice will be used to respond to voice input regardless of which user is using the device. However, different users may have different preferences regarding the kind of voice used in response to their voice input.

Therefore, what is needed is a means to solve the problem described above.

BRIEF DESCRIPTION OF THE DRAWINGS

Many aspects of the present disclosure should be better understood with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
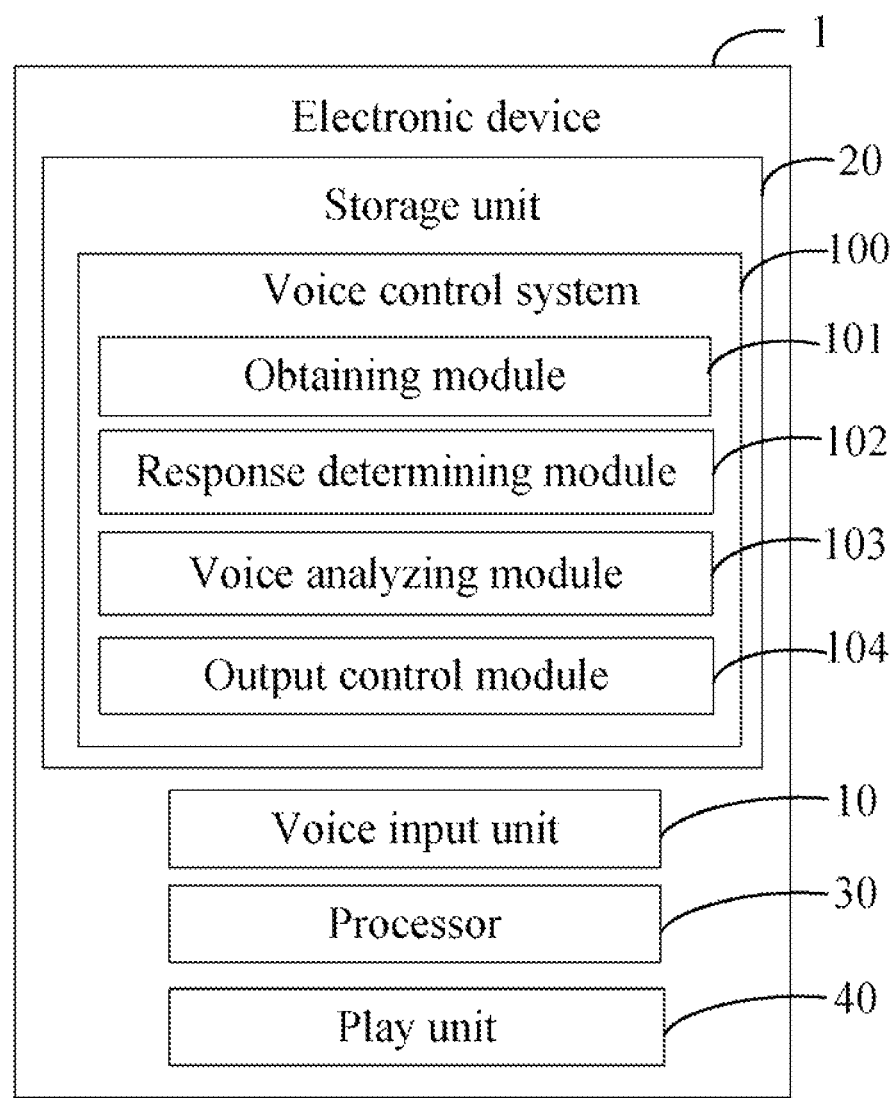
FIG. 1 is a block diagram of an electronic device, in accordance with an exemplary embodiment.

FIG. 1 is a block diagram of an electronic device 1 according to an exemplary embodiment. The electronic device 1, such as a mobile phone, a tablet computer, or a multimedia player for example, includes a voice input unit 10 (e.g., a microphone), a storage unit 20, a processor 30, and a play unit (e.g., a speaker 40). The storage unit 20 stores a voice control system 100. The system 100 includes a variety of modules executed by the processor 30 to provide the functions of the system 100. A detailed description of the variety of modules will be described as follows.

In the embodiment, the system 100 includes an obtaining module 101, a response determining module 102, a voice analyzing module 103, and an output control module 104.

The obtaining module 101 obtains voice signals input by a user via the voice input unit 10.

The response determining module 102 determines which content is input according to the obtained voice signals using known voice recognition technology, and then searches in a conversation database stored in the storage unit 20 to find a response corresponding to the input content.

The voice analyzing module 103 analyzes voice characteristics of the obtained voice signals to differentiate between various users of the electronic device 1. In the embodiment, the voice characteristics include voice pitch, voice intensity, and speed of speech of the voice of the obtained voice signals. Various ranges of voice characteristics are each associated with a particular style of response voice, and the association table between different ranges of voice characteristics and styles of response voice is pre-stored in the storage unit 20. So that each user may experience a unique response voice than other users will experience.

The voice analyzing module 103 further compares the voice characteristics of the obtained voice signals with the pre-stored ranges and selects the associated response voice. In the embodiment, the associated response voice has a different voice pitch, same voice intensity, and same speed of speech with respect to the input voice signals.

The output control module 104 outputs the found response using the associated response voice via the play unit 40.

With such configuration, the response voice is determined according to voice characteristics of input voice signals before outputting the found response. Thus, the electronic device 1 can output the found response according to speech characteristics of individual users, providing unique user experiences.

Figure 2:
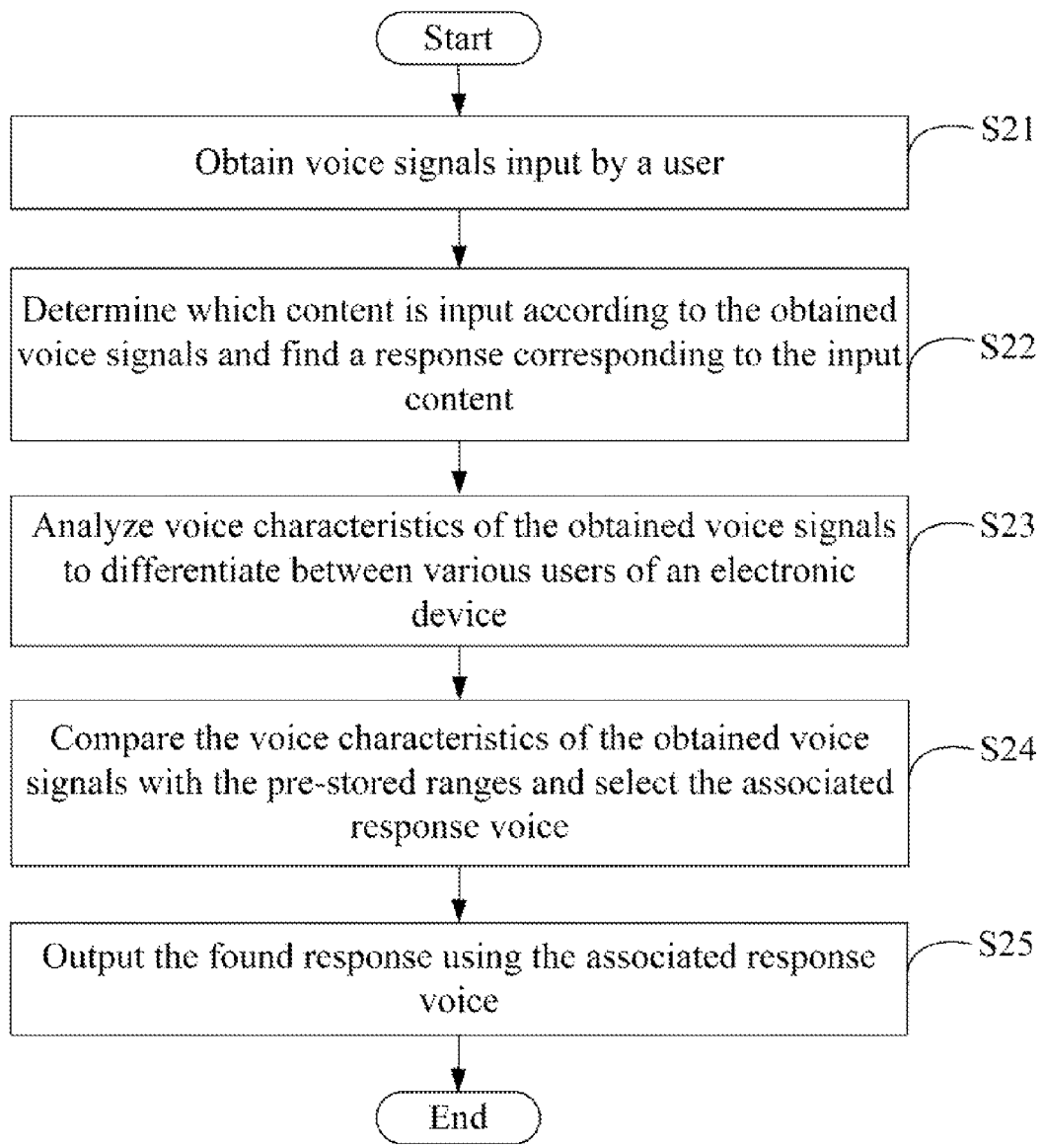
FIG. 2 is a flowchart of a voice control method, in accordance with an exemplary embodiment.

FIG. 2 is a flowchart of a voice control method, in accordance with an exemplary embodiment.

In step S21, the obtaining module 101 obtains voice signals input by a user via the voice input unit 10.

In step S22, the response determining module 102 determines which content is input according to the obtained voice signals using known voice recognition technology, and then searches in a conversation database stored in the storage unit 20 to find a response corresponding to the input content.

In step S23, the voice analyzing module 103 analyzes voice characteristics of the obtained voice signals to differentiate between various users of the electronic device 1. Various ranges of voice characteristics are each associated with a particular style of response voice.

In step S24, the voice analyzing module 103 compares the voice characteristics of the obtained voice signals with the pre-stored ranges and selects the associated response voice.

In step S25, the output control module 104 outputs the found response using the associated response voice via the play unit 40.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
    a voice input unit;
    a play unit;
    a storage unit storing a plurality of modules, a conversation database of responses each corresponding to a content of voice signals, and an association table between different ranges of voice characteristics and styles of response voice, each range of voice characteristics being associated with a particular style of response voice; and
    a processor to execute the plurality of modules,
    wherein the plurality of modules comprises:
        an obtaining module to obtain voice signals input via the voice input unit;
        a response determining module to determine which content is input according to the obtained voice signals, and search in the conversation database to find a response corresponding to the input content;
        a voice analyzing module to analyze voice characteristics of the obtained voice signals to differentiate between various users of the electronic device, compare the voice characteristics of the obtained voice signals with the pre-stored ranges, and select the associated response voice, wherein the voice characteristics comprise voice pitch, voice intensity, and speed of speech of the voice of the obtained voice signals; and an output control module to output the found response using the associated response voice via the play unit, wherein the associated response voice has different voice pitch, same voice intensity, and same speed of speech with respect to the input voice signals.

2. A voice control method applied in an electronic device, the electronic device comprising a voice input unit, a play unit, and a storage unit storing a conversation database of responses each corresponding to a content of voice signals, and an association table between different ranges of voice characteristics and styles of response voice, each range of voice characteristics being associated with a particular style of response voice, the method comprising:

obtaining voice signals input via the voice input unit;

determining which content is input according to the obtained voice signals;

searching in the conversation database to find a response corresponding to the input content;

analyzing voice characteristics of the obtained voice signals to differentiate between various users of the electronic device, wherein the voice characteristics comprise voice pitch, voice intensity, and speed of speech of the voice of the obtained voice signals;

comparing the voice characteristics of the obtained voice signals with the pre-stored ranges and selecting the associated response voice; and outputting the found response using the associated response voice via the play unit, wherein the associated response voice has different voice pitch, same voice intensity, and same speed of speech with respect to the input voice signals.

* * * * *